United States Patent [19]

Kuchenbecker

[11] Patent Number: 4,740,163

[45] Date of Patent: Apr. 26, 1988

[54] CHANNEL OPENING FEATURE FOR CARTONS

[75] Inventor: Morris W. Kuchenbecker, Neenah, Wis.

[73] Assignee: James River-Norwalk, Inc., Norwalk, Conn.

[21] Appl. No.: 724,686

[22] Filed: Apr. 19, 1985

Related U.S. Application Data

[63] Continuation-in-part of Ser. No. 548,089, Nov. 2, 1983, Pat. No. 4,546,884.

[51] Int. Cl.⁴ ............................ B31B 1/25; B31B 3/14
[52] U.S. Cl. ........................................ 493/56; 493/60; 493/82; 493/356; 493/370; 493/963; 206/612; 220/266; 225/2
[58] Field of Search ......... 493/56, 60, 61, 64, 493/73, 340, 354, 356, 963, 341, 342, 369, 370, 110, 59, 82; 206/606, 612, 608; 220/266; 225/2

[56] References Cited

U.S. PATENT DOCUMENTS

| | | | |
|---|---|---|---|
| 527,963 | 10/1894 | Gay | 83/875 |
| 1,602,597 | 10/1926 | Staude | 493/327 |
| 2,138,788 | 11/1938 | Hart et al. | 493/370 |
| 3,074,327 | 1/1963 | Grahn | 493/352 |
| 3,267,780 | 8/1966 | Roth | 493/355 |
| 3,386,323 | 6/1968 | Dovey | 83/440.1 |
| 3,401,608 | 9/1968 | Lobombarde | 493/276 |
| 3,426,959 | 2/1969 | Lemelson | 206/605 |
| 3,577,484 | 5/1971 | Jacobson | 229/3.5 R |
| 3,654,842 | 4/1972 | Schwenk | 493/287 |
| 3,719,548 | 3/1973 | Keck | 428/40 |
| 3,830,140 | 8/1974 | Rausing et al. | 493/56 |
| 4,135,438 | 1/1979 | Sugioka | 493/326 |
| 4,160,894 | 7/1979 | Stemmler et al. | 493/341 |
| 4,327,833 | 5/1982 | Kuchenbecker | 206/621 |
| 4,362,245 | 12/1982 | Kuchenbecker | 206/621 |

FOREIGN PATENT DOCUMENTS

| | | | |
|---|---|---|---|
| 54907 | 6/1982 | European Pat. Off. | 225/2 |
| 1454566 | 10/1966 | France | 220/266 |

Primary Examiner—Frederick R. Schmidt
Assistant Examiner—William Terrell
Attorney, Agent, or Firm—Finnegan, Henderson, Farabow, Garrett & Dunner

[57] ABSTRACT

A container is constructed from a paperboard sheet having a channel including a surface area of the paperboard sheet from which paperboard material has been removed and a tear strip at least partially bounded by the channel for opening the container by separation of the paperboard sheet along the channel.

16 Claims, 5 Drawing Sheets

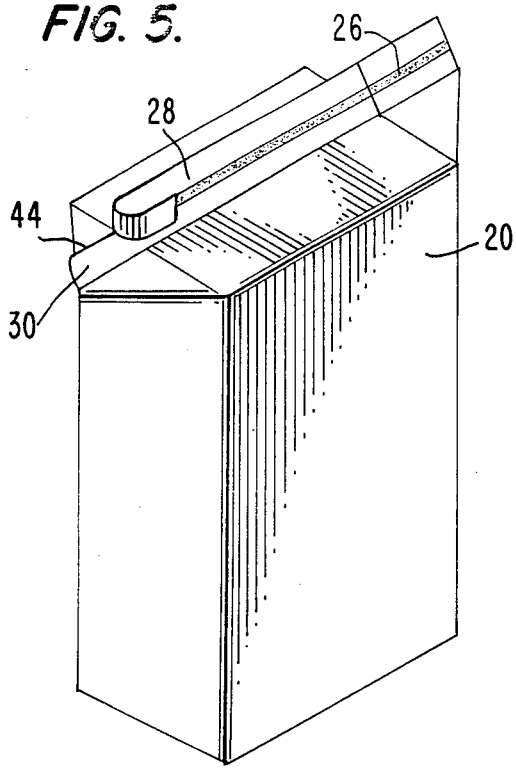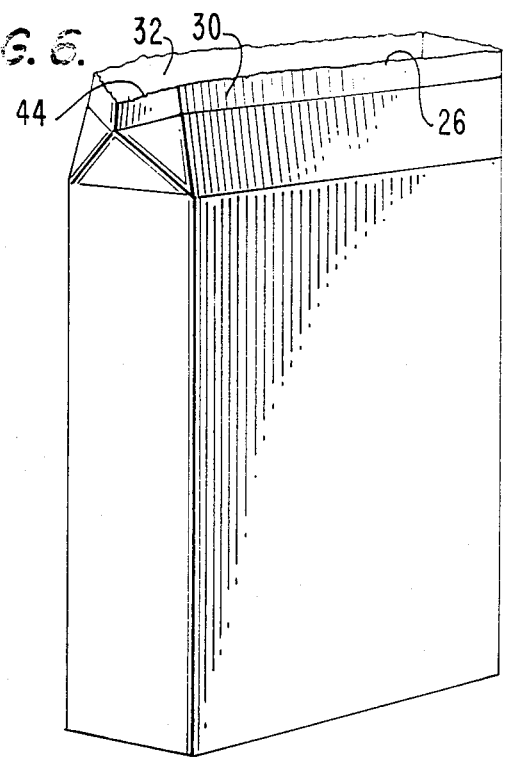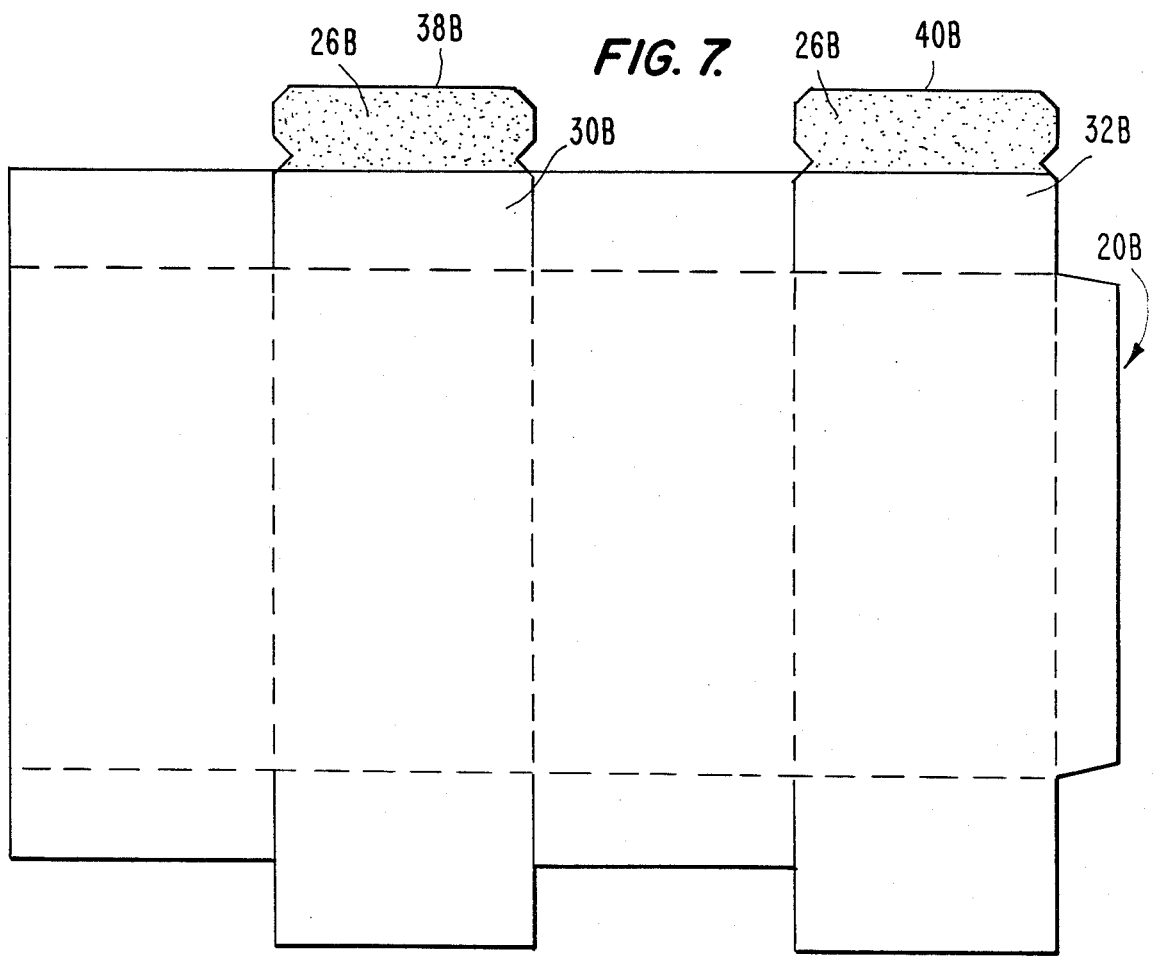

CHANNEL OPENING FEATURE FOR CARTONS

RELATED APPLICATION INFORMATION

This application is a continuation-in-part of U.S. Ser. No. 548,089, filed Nov. 2, 1983, now U.S. Pat. No. 4,546,884 issued 10-15-85, which is hereby incorporated by reference in this application.

BACKGROUND OF THE INVENTION

1. Field of the Invention

The present invention relates to opening features for cartons and more particularly relates to line of weakness opening features.

2. Description of the Prior Art

Cartons have been designed to hold dry or liquid products. A typical carton has a core structural layer of paperboard providing the carton strength and rigidity. In a liquid type carton, a layer of aluminum foil is adhered to one surface of the paperboard and serves as a barrier layer against passage of contaminants into the carton. The inner surface and sometimes the outer surface is then coated with heat sealable plastic. While a number of specific constructions are known, it is generally accepted practice to provide such cartons with lines of weakness which facilitate the process of opening the carton for use of its contents.

Cut lines of weakness have been used as opening features. The cut lines of weakness are made by a knife blade mounting arrangement in a printing press which allows the carton blanks to be printed and cut at the same time. In such a process, the cut lines of weakness are cut all the way through the paperboard prior to the process of coating the paperboard with heat sealable plastic as described above. In such a manner, the paperboard is completely cut at the line of weakness while the plastic completely seals the package hermetically.

However, this method and apparatus have disadvantages and drawbacks. The expense in set-up and equipment for performing the simultaneous cutting and printing operation makes it prohibitive for smaller specialized production runs. In addition, this process for forming lines of weakness must be executed prior to the step of coating the paperboard with heat sealable plastic. This is because a knife cut which does not pass completely through the paperboard layer does not tear along the line of weakness whereas attempting to make a knife cut completely through the paperboard layer after the process of coating the paperboard with the plastic coating would greatly increase the chance of perforating the plastic coating and thus destroying the hermetic seal.

In addition, the current knife cut process, when used on the spout edge of a container for liquid material, tends to create an arrangement on the spout edge which allows liquid poured from the spout to dribble down the outside of the container during or after pouring.

Therefore, it is an object of the present invention to provide a carton having a line of weakness opening feature which can be readily manufactured in any quantity in a cost effective manner.

It is a further object of the invention to provide a carton having a line of weakness which can be formed subsequent to printing and coating with a heat sealable plastic.

It is an additional object of the invention to provide a carton with its pour spout that can be readily manufactured in any bulk quantity.

It is still a further object of the present invention to provide a carton having a pour spout opened by tearing along a line of weakness that forms an edge on the spout that resists dribbling of the liquid poured from the spout.

It is an additional object of the present invention to provide a carton having a line of weakness which provides for ease in opening and hermetic sealing which avoids the need for a separate inner liner to hold the carton contents.

It is still an additional object of the present invention to provide a carton having a line of weakness which provides for ease in opening and accuracy in tearing along the line of weakness.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, there is provided a method of forming a tearable portion in a container panel of predetermined thickness for opening the container which comprises: forming a planar blank having panels foldable into a container, with one of said panels providing a closure for the container; removing material from said closure panel to form a linearly extending channel section of predetermined depth; and folding the panels to form a container with a portion of the closure panel tearable along the channel for opening the container. It is preferable to perform the removing step by imparting transverse relative movement between the planar blank and either a routing tool or a laser beam.

In addition, a method is provided of forming a container from a paperboard sheet which comprises: securing a liner material to one side of the paperboard sheet; removing paperboard material from the second side of the paperboard sheet to form at least one linear channel section extending into the paperboard sheet so that the paperboard sheet is separable along the channel for opening the container. It is preferable that the removing step include removing paperboard material to form a channel extending into but not through the paperboard sheet and that the securing step precedes the removing step.

In addition, a container is provided, constructed from a paperboard sheet formable into an erected position, the paperboard sheet comprising: a first surface, a second surface, means defining a channel on the first surface including a surface area of the paperboard sheet from which paperboard material has been removed, tear strip means at least partially bounded by the means defining a channel for opening the container by separation of the paperboard sheet along the means defining a channel.

Further, a liquid type container is provided constructed from structural carton material having a predetermined thickness and including means for opening the carton and forming a drip resistant spout comprising: a spout portion, a tear-off portion separable from the spout portion for forming a spout edge on the spout portion, and channel means between the spout portion and the tear-off means for forming projecting fibers along the spout edge upon removal of the tear-off portion for forming a drip resistant spout.

BRIEF DESCRIPTION OF THE DRAWINGS

The accompanying drawings, which are incorporated in and constitute a part of the specification, illustrate a preferred embodiment of the invention and, together with a general description of the invention given above in the detailed description of the preferred embodiment given below, serve to explain the principles of of the invention.

FIG. 5 is a perspective view of the erected blank of FIG. 4 in a partially opened condition;

FIG. 6 is a perspective view of the erected blank of FIG. 4 in a fully opened condition;

FIG. 7 is a plan view of a blank depicting the third embodiment of the invention shown in FIG. 3;

Figure 1:
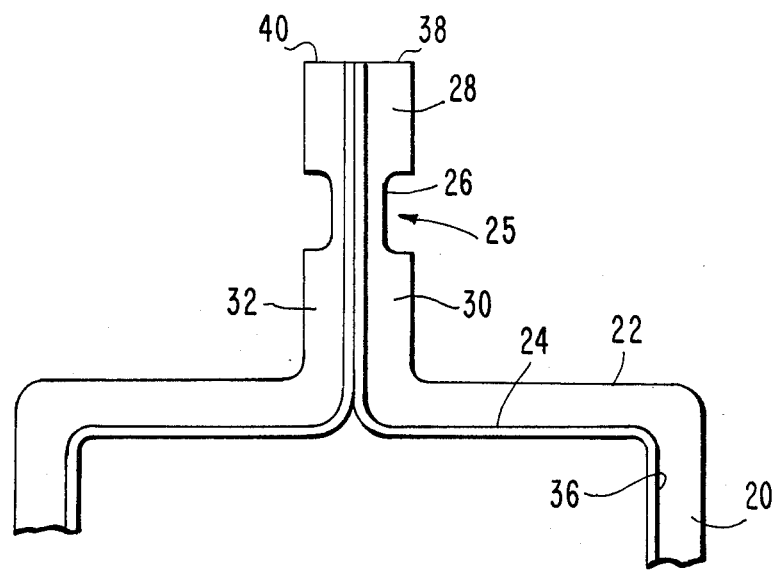
FIG. 1 is a cross-sectional view of the closure panels of a first embodiment incorporating the teaching of the present invention.

Reference will now be made in detail to the present preferred embodiments of the invention as illustrated in the accompanying drawings.

DETAILED DESCRIPTION OF THE PREFERRED EMBODIMENTS

In accordance with the present invention there is provided a container constructed from a paperboard sheet formable into an erected position, the paperboard sheet comprising a first surface, a second surface, means defining a channel on the first surface including a surface area of the paperboard sheet from which paperboard material has been removed, tear strip means at least partially bounded by the means defining a channel for opening the container by separation of the paperboard sheet along the means defining a channel. As illustratively shown in FIGS. 1, 4, and 5, the container is constructed from a paperboard sheet 20 formable into an erected position. Paperboard sheet 20 comprises a first surface 22 and a second surface 24. Paperboard sheet 20 also includes means defining a channel 25 on the first surface including a channel surface area 26 of the paperboard sheet from which paperboard material has been removed. Further, paperboard sheet 20 includes tear strip means 28 at least partially bounded by the means for defining a channel, such as surface area 26. As shown in FIG. 5, the container is opened by separating paperboard sheet 20 along channel surface area 26. FIG. 6 shows the container in its fully opened position.

In accordance with the present invention, there is provided a method for forming a tearable portion in a container panel of predetermined thickness for opening the container which comprises forming a planar blank having panels foldable into a container, with one of the panels providing a closure for the container; removing material from the closure panel to form a linearly extending channel section of predetermined depth; and folding the panels to form a container with a portion of the closure panel tearable along the channel for opening the container.

Figure 4:
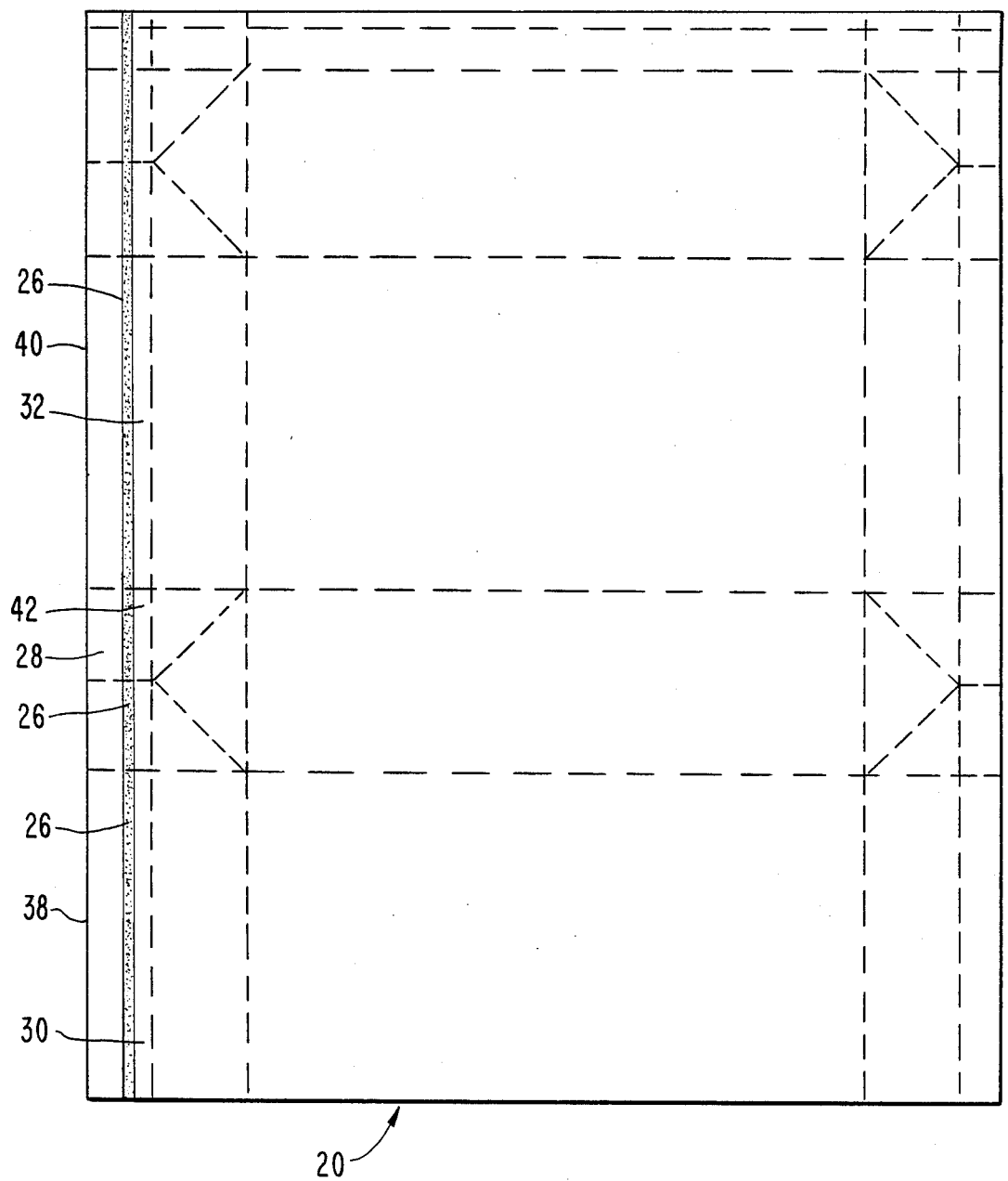
FIG. 4 is a plan view of a blank depicting the first embodiment of the present invention shown in FIG. 1.

FIG. 4 shows a planar blank formed from paperboard sheet 20 having panels defined by the broken lines such that paperboard sheet 20 is foldable into a container. At least one of the panels provides a closure for the container. In this embodiment, panels 30 and 32 are folded together to form the closure construction shown in FIGS. 1, 5 and 6.

Material is removed from closure panels 30 and 32 to form a linearly extending channel section of predetermined depth such as channel surface section 26. The removing step preferably comprises imparting transverse relative movement between the planar blank and either a routing tool or a laser beam.

In the present preferred embodiment, it is found preferable that the removing step comprises removing sufficient material to form a channel section with a width greater than the predetermined depth and with a depth extending beyond the midsection of the panel thickness but less than the predetermined thickness of the paperboard container panel. It is additionally preferable to form the channel section with a width of approximately 3/32 inches at the surface of the container panel. Performing the removing step in this manner facilitates accurate tearing along the channel section when the container is opened.

Figure 2:
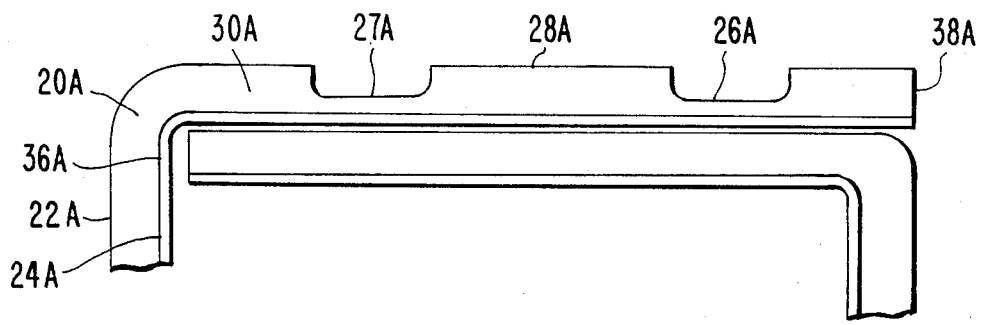
FIG. 2 is a cross-sectional view of the closure panels of a second embodiment incorporating the teachings of the present invention.
Figure 8:
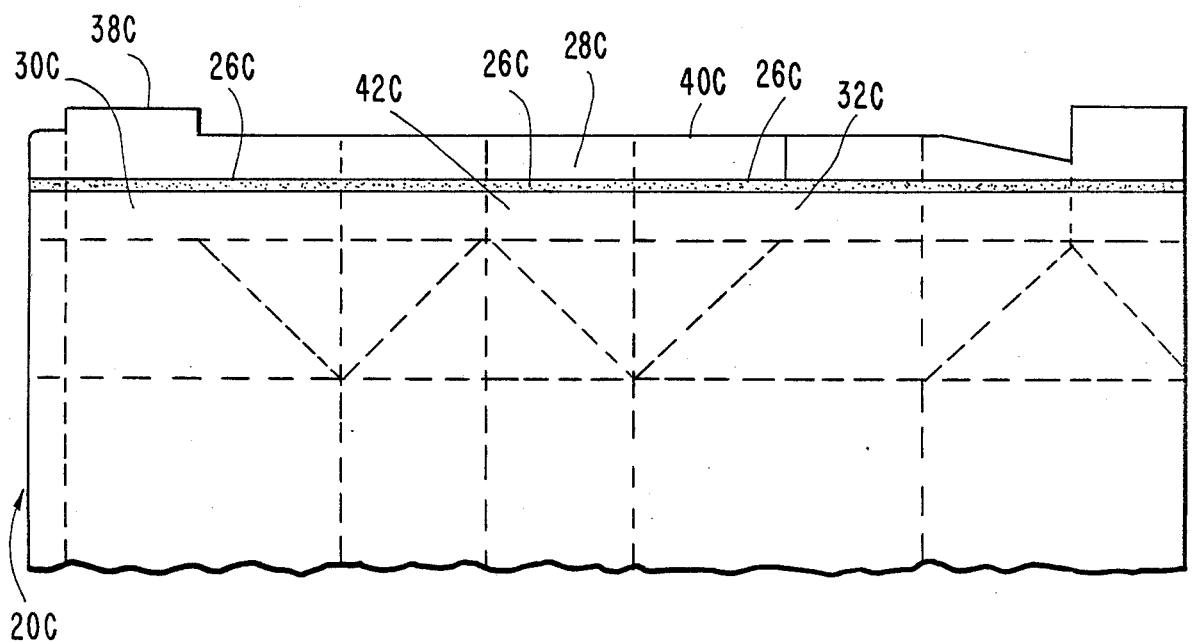
FIG. 8 is a plan view of a blank depicting a fourth embodiment which is the subject of the parent application to this continuation-in-part.

To facilitate production of the planar blanks, it is preferable to perform the removing step in a single pass relative to the removing tool such as a routing tool or laser beam. Therefore, it is preferable to perform the removing step by imparting the transverse relative movement only once. As shown in FIGS. 4, 7 and 8, surface area 26 defining the channel section is seen to comprise a surface area extending completely across the blank in a linear fashion with no interruptions which require controlled movements. It is noted that the embodiment shown in FIG. 2 may be produced in the same manner except that two spaced routing tools or laser beams are used simultaneously to form the two channel sections which appear in that embodiment. Therefore, such a process allows the removing step to be performed in an easy manner in the minimum amount of time per unit piece.

According to the present invention a method is provided for forming a container from a paperboard sheet which comprises securing a liner material to one side of the paperboard sheet; removing paperboard material from the second side of the paperboard sheet to form at least one linear channel section extending into the paperboard sheet so that the paperboard sheet is separable along the channel for opening the container. It is additionally preferable that the securing step precedes the removing step. Such method steps, especially when performed in the recited order, allow the formation of a channel section which is distinguishable from known lines of weakness formed by knife cuts in that the step of forming the line of weakness may be performed after the liner material is secured to one side of the paperboard sheet and after the paperboard sheet is printed.

The recited method does not require a line of weakness which completely passes through the paperboard layer in order to allow accurate tearing along the line of weakness whereas a knife cut must be made completely through the paperboard layer in order to allow accurate tearing along the line of weakness. Therefore, if an effective knife cut is made after the process of coating the paperboard with a plastic coating, it would have to be made completely through the paperboard layer but not through the plastic layer. It is excessively difficult or impossible to efficiently perform such a process without greatly increasing the chance of perforating the plastic coating and thus destroying the hermetic seal provided by the layer of plastic. Therefore, the present method allows the removing step to be performed after the securing step. Such a method is preferable in producing small quantity orders of a specific container arrangement. As shown in FIG. 1, the product resulting from the process comprises paperboard sheet 20 and a liner material 36 secured to one side of paperboard sheet 20. Liner material 36 is preferably a heat sealable plastic which allows the container to be sealed in the area of closure panels 30 and 22.

In accordance with the present invention, there is provided a method in which the forming step comprises forming a planar blank having panels including a pair of flaps each with a free edge and foldable so that a section of one flap overlies a section of the other flap; the removing step comprises removing material from each flap along a line spaced from the free edge to form a channel section spaced from the free edge; and the folding step comprises folding the flaps to overlie each other with a channel section on the outer surface of each of the flaps, the depths of the channel sections aligned and extending toward each other to form a tear section between the channels and the free edges of the flaps.

As embodied herein, the blank shown in FIG. 4 has panels including a pair of flaps 30 and 32 each with a free edge 38 and 40, respectively. A pair of flaps 30 and 32 are foldable so that a section of one flap overlies a section of the other flap as shown in FIGS. 1 and 5. As further seen from these figures, the removing step comprises removing material from each flap along a line spaced from the free edge to form a channel section including channel surface area 26 spaced from free edges 38 and 40. As shown in FIGS. 1 and 5, the folding step comprises folding flaps 30 and 32 to overlie each other with the channel sections of channel surface areas 26 on the outside surface 22 of each of the flaps with the depths of the channel sections aligned and extending toward each other to form a tear section such as tear strip means 28 between the channel sections in surface area 26, and the free edges 38 and 40 of flaps 30 and 32.

Figure 9:
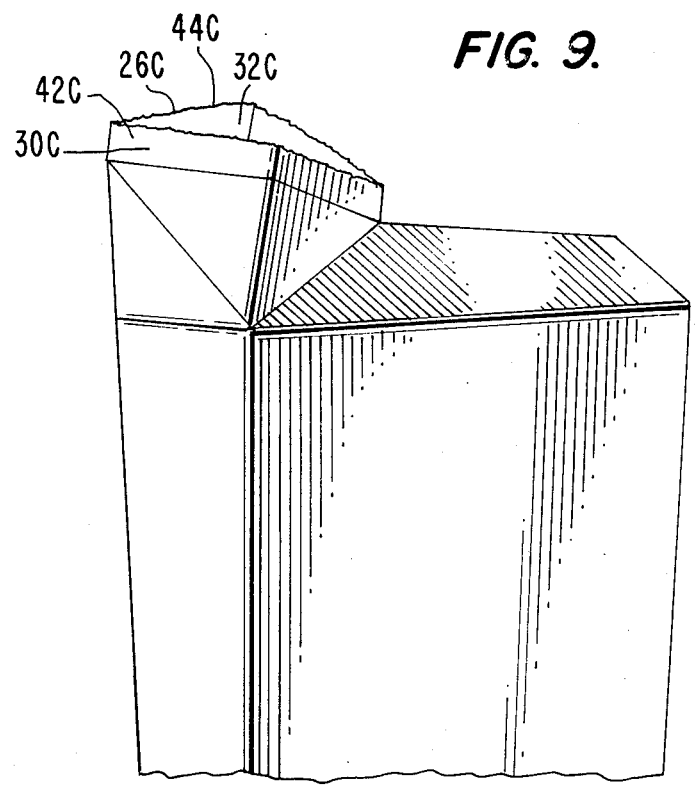
FIG. 9 is a perspective view of the embodiment shown in FIG. 8 in an erected and opened position.
Figure 10:
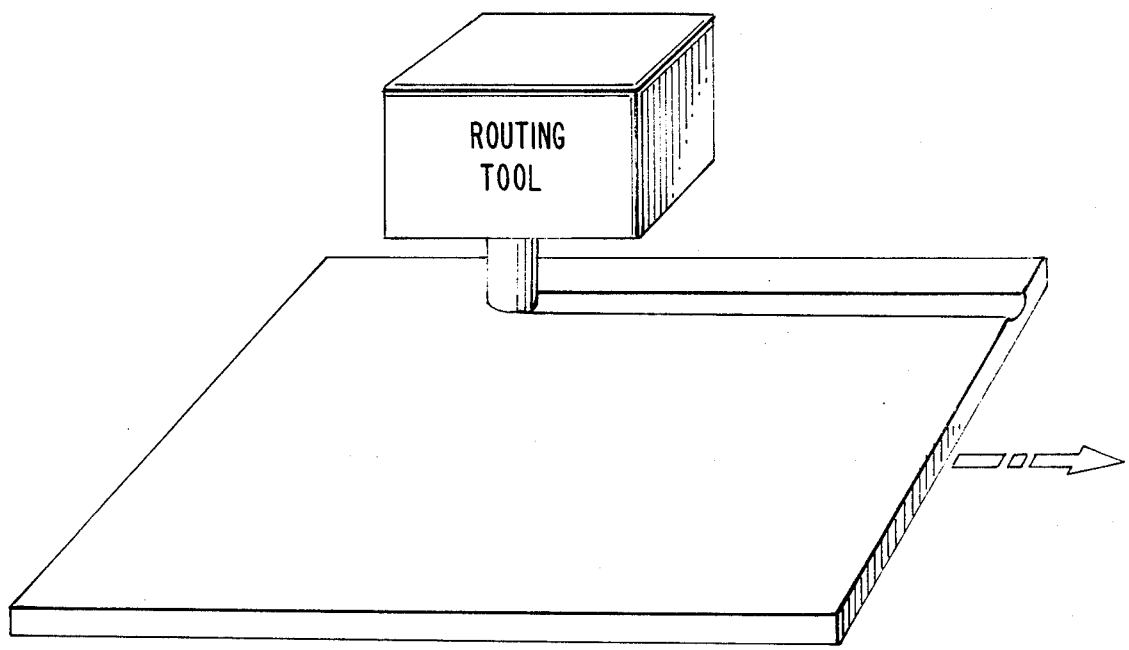
FIG. 10 is a perspective view of a routing tool removing material from a blank.
Figure 11:
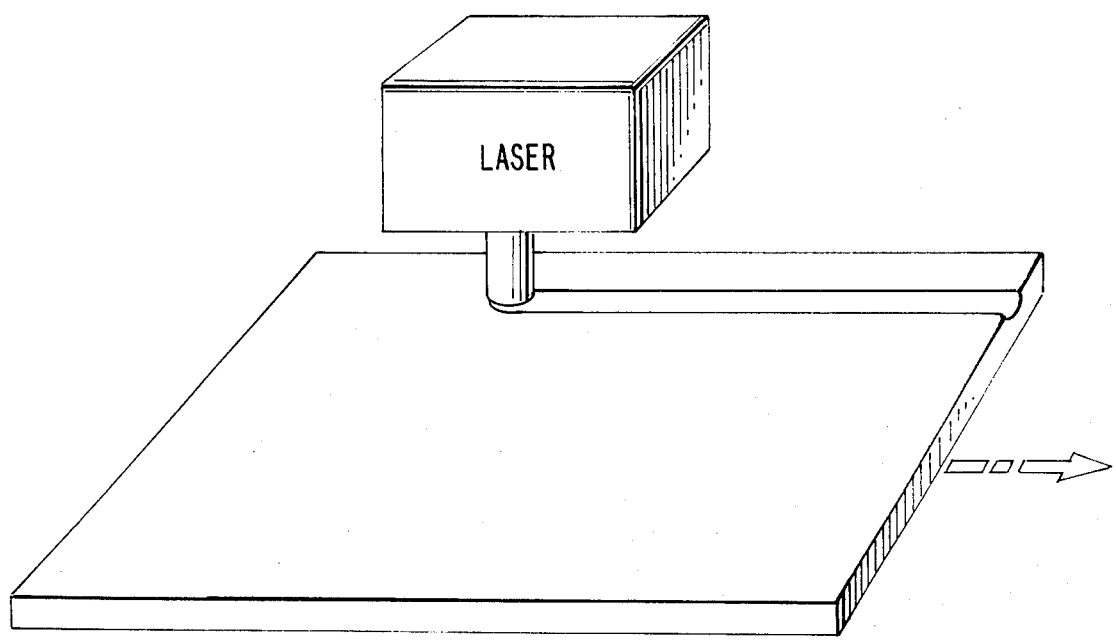
FIG. 11 is a perspective view of a laser removing material from a blank.

Corresponding numerals followed by the letter C identify corresponding parts of the embodiment shown in FIGS. 8 and 9. The manner of constructing planar blank 20C shown in FIG. 8 and erecting and opening it to the position shown in FIG. 9 are fully explained in parent U.S. application Ser. No. 548,089 filed Nov. 2, 1983 which has been incorporated by reference into this application.

The embodiment shown in FIGS. 1, 4, 5 and 6 and the embodiment shown in FIGS. 8 and 9 are particularly arranged to define a pour spout area and are specifically appropriate for being used to contain liquids which can be dispensed from the pour spouts. In accordance with the present invention there is provided a liquid type container constructed from a fibrous carton material having a predetermined thickness and including means for opening the container and forming a drip resistant spout comprising a spout portion, a tear-off portion separable from the spout portion for forming a spout edge on the spout portion, and channel means between the spout portion and the tear-off portion for forming projecting fibers along the spout edge upon removal of the tear-off portion for forming a drip resistant spout.

As embodied in FIGS. 1, 4, 5, and 6, the container comprises a spout portion 42, a tear-off portion separable from the spout portion 42 for forming a spout edge 44 on the spout portion 42, and channel means including surface area 26 between the spout portion 42 and the tear-off portion 28 for forming projecting fibers along the spout edge 44 upon removal of the tear-off portion 28 for forming a drip resistant spout. The embodiment shown in FIGS. 8 and 9 include numerals followed by the letter C to designate elements corresponding to those described above.

The formation of projecting fibers all along the spout edge creates a wicking which lifts the poured liquid over the spout edge of the container to prevent the liquid from clinging to and dribbling down the outside of the container during or after pouring. In contrast, a cut line of weakness does not provide projecting fibers of such a nature or a rough, fuzzy surface bordering the spout edge of the container on the outside surface which prevents the poured liquid from clinging and dribbling. In particular, it is seen that such a liquid type container with a drip resistant spout is formed by a process comprising the step of removing container material along the line to form a channel having a depth less than the predetermined thickness of the container material and a sufficient width for forming projecting fibers along the spout edge upon removal of the tear-off portion for forming a drip resistant spout. A related matter involving the formation of a spout having a tit is disclosed in U.S. Pat. No. 4,327,833 to Kuchenbecker which is hereby incorporated by reference.

In accordance with the present invention there is provided a method wherein the removing step comprises removing material from one of the panels to form a second linearly extending channel section spaced from the first recited linearly extending channel section and defining a tear-off section between the first and second linearly extending channel sections. As embodied in FIG. 2, there is a panel 30A having a first linearly extending channel section including first channel surface area 26A formed by removing material from closure panel 30A and a second linearly extending channel section including channel surface area 27A, spaced from first channel surface area 26A and defining a tear-off section 28A between the first and second channel surface areas 26A and 27A.

In accordance with the present invention, the resulting container blank comprises a sheet of fibrous paperboard material 20A having a first surface 22A and a second opposing surface 24A; a sheet of impervious liner material 36A joined to the second surface 24A of the paperboard sheet 20A; and the paperboard sheet 20A having a pair of elongated continuous channels 26A and 27A extending in parallel relation across the first surface 22A for forming a tear-off section 28A bounded by the channels 26A and 27A, each of the channels 26A and 27A having a width exceeding the depth thereof, the channels terminating in bottom surfaces which lie between the midsections of the thickness of the paperboard sheet 20A and the second surface 24A of the paperboard sheet. By using a heat sealable liner material 36A, this arrangement, or in fact, any arrangement shown as the preferred embodiments of the present invention can be used as a hermetically sealed package for containing a material which, because of the hermetic seal, does not need to be contained within a separate hermetically sealed package within the container as described herein. For instance, in the embodiment shown in FIG. 2, the liner material 36A can be heat sealed between free edge 38A and the area adjacent to the area underlying first channel section 26A. In FIG. 1, the heat sealed area would be the area underlying tear strip 28.

In accordance with the present invention there is provided a method wherein the forming step comprises forming a planar blank having panels including a pair of flaps, each with a free edge and each foldable to overlie a section of one flap with a section of the other flap; the removing step comprises removing material adjacent to the top edges to form the channel section adjacent to the free edge of each flap; and the folding step comprises folding the pair of flaps so that a section of one flap overlies a section of the other flap, and so that the free edge of one flap nests in the channel section formed in the other flap.

Figure 3:
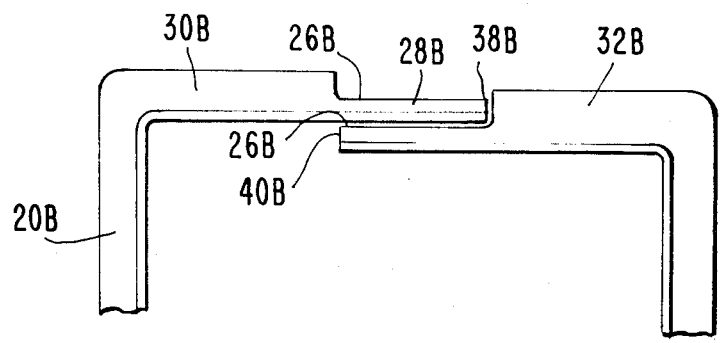
FIG. 3 is a cross-sectional view of the closure panels of a third embodiment incorporating the teachings of the present invention.

As embodied in FIGS. 3 and 7, the planar blank of paperboard 20B has panels including a pair of flaps 30B and 32B, each with a free edge 38B and 40B, and each foldable to overlie a section of one flap with a section of the other flap as shown in FIG. 3. The removing step comprises removing material adjacent to the top edges to form a channel section including surface areas 26B adjacent to the free edge 38B and 40B of each flap 30B and 32B. As shown in FIG. 3, the folding step comprises folding the pair of flaps 30B and 32B so that a section of one flap 30B overlies a section of the other flap 32B so that the free edge 38B of one flap nests in the channel section 26B formed in the other flap 32B. Although this is the preferred embodiment of an arrangement similar to that shown in FIGS. 3 and 7, it is also possible to provide an arrangement in which the removing step removes material adjacent to the top edge of only one flap and that the second flap is folded and nests in the channel section formed in the first flap. In the embodiment shown in FIGS. 3 and 7, there is a tear strip 28B defined by the overlying areas of flaps 30B and 32B in the area of channel sections 26B and further defined by free edges 38B and 40B.

It is to be noted that when a channel section is torn, it forms upstanding fibers which lift the liquid being poured over the edge and prevent the poured liquid from dribbling down the end wall and spout. The ability of the upstanding fibers to remain upstanding depends on the thickness of the board that remains after the process of removing materials from the paperboard to form the channel sections. It is found that a thicker board increases the ability of the fibers to remain upstanding during pouring. However, this is to be calculated with the fact that thicker boards are more expensive, weigh more, and are harder to tear.

It has been noted that the lines of structural weakness described in this application are channels which may be formed by mechanically removing a narrow layer of paperboard or by burning away a narrow layer of paperboard by means of laser radiation. Preferably the line of structural weakness is formed by routing a channel into the outer surface of the blank. When such a line of structural weakness is torn, it forms upstanding fibers that lift the liquid being poured over the edge and prevent it from dribbling down the end wall and spout.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of applicant's general inventive concept.

What is claimed is:

1. A method of forming a container with a controllably tearable closure portion from a fibrous sheet comprising:

forming a planar blank having panels and a closure portion which are foldable into an erected container;

removing fibrous material from the closure portion, shaping by said removing at least one linearly extending channel section extending into but not through the fibrous sheet, the channel section having a predetermined depth and width, the width of the channel section being defined by channel walls, and producing by said shaping a controllably tearable line of weakness along the channel section and within the channel section walls which facilitates opening the container along the channel section whereby upon opening the container by tearing along the closure portion a ragged edge delimited by the channel walls is formed along the line of weakness where tearing occurs; and folding the panels and forming by said folding an erected container with a controllably tearable closure portion.

2. The method of claim 1 wherein the removing step includes forming a rough fuzzy surface in the channel section.

3. The method of claim 1 wherein the removing step comprises removing material from said one of the panels to form a second linearly extending channel section spaced from the first recited linearly extending channel section and defining a tear-off section between the first and second linearly extending channel sections.

4. The method of claim 1 wherein the step of forming the planar blank includes forming panels having a pair of flaps, each with a free edge and each foldable so that a section of one flap overlies a section of the other flap; wherein the removing step includes removing material from each flap along a line spaced from the free edge to form the channel section in each flap spaced from the free edge; and wherein the folding step includes folding and overlying the flaps with the channel section on the outside surface of each of the flap, aligning the depth of the channel section on the overlying flaps, and forming a tear section between the channel section and the free edge of the flaps.

5. The method of claim 1 wherein the step of forming the planar blank includes forming panels having a pair of flaps, each with a free edge and each foldable to overlie a section of one flap with a section of the other flap;

wherein the removing step includes removing material adjacent to the top edges to form a channel section adjacent to the free edge of each flap; and wherein the folding step includes folding the pair of flaps so that a section of one flap overlies a section of the other flap and so that the free edge of one flap nests in the channel section formed in the other flap.

6. The method of claim 1 wherein the step of forming the planar blank includes forming panels having first and second flaps, each with a free edge and each foldable to overlie a section of one flap with a section of the other flap;

wherein the removing step includes removing material adjacent to the top edge of the first flap to form the channel section adjacent to the free edge of the first flap; and wherein the folding step includes folding the second flap so that a section of the second flap overlies the channel section of the first flap and so that the free edge of the second flap nests in the channel section formed in the first flap.

7. The method of claim 1 wherein the shaping step comprises shaping the predetermined width of the channel section to be greater than the predetermined depth.

8. The method of claim 1 wherein the shaping step comprises shaping the predetermined depth of the channel section through and beyond the midsection of the panel.

9. The method of claim 1 wherein the shaping step comprises forming the channel section with a width of approximately three thirty-seconds inches at the surface of the container panel.

10. The method of claim 1 wherein said removing step comprises imparting the transverse relative movement between said planar blank and a laser beam.

11. The method of claim 1 wherein said removing step comprises:

imparting transverse relative movement between said planar blank and a routing tool.

12. The method of claim 11 wherein said removing step comprises imparting the transverse relative movement only once.

13. The method of claim 1 further comprising the step of securing a liner material to one side of the fibrous sheet; and wherein the removing step includes removing fibrous material from the side of the fibrous sheet opposite the liner material.

14. The method of claim 13 wherein the securing step precedes the removing step.

15. The method of claim 13 wherein the linear material is a heat sealable plastic.

16. A method of forming a container from a tearable container blank, which comprises:

securing a liner material to a first surface on a paperboard sheet leaving an exposed second second surface on said paperboard sheet;

removing paperboard material from said second exposed surface of said paperboard sheet, and forming by said removing a first channel extending across said exposed surface with a width defined by channel walls, the width of the channel exceeding its depth, which depth extends beyond the midsection of the thickness of said paperboard sheet and with a bottom channel surface spaced from the first surface of the paperboard sheet; and removing additional material from said second exposed surface of said paperboard sheet, and forming by said removing a second channel extending across said exposed surface with a width defined by channel walls, the width of the channel exceeding its dpeth, which depth beyond the midsection of the thickness of said paperboard sheet and with a bottom channel surface spaced from the first surface of the paperboard sheet, said second channel spaced from said first channel and providing by said forming a tear strip section defined by said first and second channels, the tear strip operative to provide ragged edges along and within the first and second channels when torn.

* * * * *

UNITED STATES PATENT AND TRADEMARK OFFICE
CERTIFICATE OF CORRECTION

PATENT NO. : 4,740,163

DATED : April 26, 1988

INVENTOR(S) : MORRIS W. KUCHENBECKER

It is certified that error appears in the above-identified patent and that said Letters Patent is hereby corrected as shown below:

Claim 16, col. 10, line 16, delete "second" (second occurrence); and

Claim 16, col. 10, line 32, "dpeth" should read --depth--.

Signed and Sealed this

Fifteenth Day of November, 1988

Attest:

DONALD J. QUIGG

Attesting Officer      Commissioner of Patents and Trademarks